United States Patent
Keskitalo et al.

(10) Patent No.: US 10,548,041 B2
(45) Date of Patent: Jan. 28, 2020

(54) REPORTING OF UPLINK (UL) QUALITY OF SERVICE (QOS) METRICS

(71) Applicant: Nokia Solutions and Networks Oy, Espoo (FI)

(72) Inventors: Ilkka Keskitalo, Oulu (FI); Jussi-Pekka Koskinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/757,724

(22) PCT Filed: Sep. 21, 2016

(86) PCT No.: PCT/FI2016/050656
§ 371 (c)(1),
(2) Date: Mar. 6, 2018

(87) PCT Pub. No.: WO2017/051073
PCT Pub. Date: Mar. 30, 2017

(65) Prior Publication Data
US 2018/0352460 A1     Dec. 6, 2018

Related U.S. Application Data

(60) Provisional application No. 62/222,985, filed on Sep. 24, 2015.

(51) Int. Cl.
*H04W 24/10* (2009.01)
*H04L 12/26* (2006.01)

(52) U.S. Cl.
CPC .......... *H04W 24/10* (2013.01); *H04L 43/065* (2013.01); *H04L 43/0858* (2013.01); *H04L 43/0888* (2013.01)

(58) Field of Classification Search
CPC ......... G06F 11/34; G06F 13/38; H04B 17/24; H04L 43/065; H04L 43/0852;
(Continued)

(56) References Cited

U.S. PATENT DOCUMENTS 7,796,505 B2 *  9/2010  Olsson ................. H04L 1/1854
                                                              370/229
9,648,514 B2 *  5/2017  Blankenship ......... H04L 69/322
(Continued)

FOREIGN PATENT DOCUMENTS

EP     2409516 A1       1/2012
EP     2667655 A1 *    11/2013
(Continued)

OTHER PUBLICATIONS

Huawei et al., 7.8 SI: Further MDT enhancements, May 29, 2015, 3GPP, 3GPP TSG-RAN WG2 Meeting #90, Tdoc: R2-152290 (Year: 2015).*
(Continued)

*Primary Examiner* — Eric Nowlin
(74) *Attorney, Agent, or Firm* — Harrington & Smith

(57) ABSTRACT

In an embodiment, to reduce uplink reporting, a user equipment (UE) keeps a count of the number of uplink protocol data control packet (PDCP) service data units (SDUs) in a measurement period and a number of those uplink PDCP SDUs that either exceeded a configured delay threshold or were discarded without being sent. These numbers are processed by the UE into a single reporting metric which the UE reports to the network for example in a MDT measurement report. The network configures the delay threshold, which may be specific for a given QoS, and may also configure the measurement period.

20 Claims, 2 Drawing Sheets

(58) Field of Classification Search
CPC ............ H04L 43/0858; H04L 43/0876; H04L 43/0888; H04W 24/08; H04W 24/10; H04W 28/02; H04W 28/0268; H04W 80/02

See application file for complete search history.

(56) References Cited

U.S. PATENT DOCUMENTS

| | | | |
|---|---|---|---|
| 9,973,954 B2* | 5/2018 | Johansson | H04W 24/10 |
| 10,250,491 B2* | 4/2019 | Lee | H04L 67/322 |
| 10,305,767 B2* | 5/2019 | Kollar | H04L 43/0852 |
| 10,334,585 B2* | 6/2019 | Vincze | H04W 72/0426 |
| 2006/0164981 A1* | 7/2006 | Olsson | H04L 1/1854 370/229 |
| 2009/0149189 A1* | 6/2009 | Sammour | H04L 1/165 455/450 |
| 2012/0088457 A1* | 4/2012 | Johansson | H04W 24/10 455/67.11 |
| 2013/0250765 A1 | 9/2013 | Ehsan et al. | |
| 2015/0043435 A1* | 2/2015 | Blankenship | H04L 69/322 370/329 |
| 2016/0037511 A1* | 2/2016 | Vincze | H04B 7/024 370/329 |
| 2017/0034025 A1* | 2/2017 | Kollar | H04L 43/0852 |
| 2017/0324652 A1* | 11/2017 | Lee | H04L 67/322 |
| 2018/0184312 A1* | 6/2018 | Yi | H04L 43/06 |
| 2018/0213426 A1* | 7/2018 | Latheef | H04W 24/10 |
| 2018/0262950 A1* | 9/2018 | Malkamaki | H04W 28/06 |
| 2018/0302816 A1* | 10/2018 | Yi | H04W 24/08 |
| 2019/0007855 A1* | 1/2019 | Lee | H04W 24/10 |
| 2019/0141550 A1* | 5/2019 | Yi | H04L 43/0852 |
| 2019/0215263 A1* | 7/2019 | Lee | H04L 43/028 |

FOREIGN PATENT DOCUMENTS

| | | | | |
|---|---|---|---|---|
| WO | WO-2008066309 A1 * | 6/2008 | ........... | H04L 1/1685 |
| WO | 2010/107355 A1 | 9/2010 | | |
| WO | 2014/189414 A1 | 11/2014 | | |
| WO | WO-2017073900 A1 * | 5/2017 | ............ | H04W 24/10 |

OTHER PUBLICATIONS

LG Electronics Inc., UL latency measurement in MDT, May 29, 2015, 3GPP, 3GPP TSG-RAN WG2 Meeting #90, Tdoc: R2-152296 (Year: 2015).*
Qualcomm Incorporated, Consideration on UL delay measurement, May 29, 2015, 3GPP, 3GPP TSG-RAN WG2 Meeting #90, Tdoc : R2-152490 (Year: 2015).*
Kyocera, Potential solutions for UL latency measurements, May 29, 2015, 3GPP TSG-RAN WG2 #90, Tdoc: R2-152627 (Year: 2015).*
Samsung, Packet delay measurement for Rel-13 MDT enhancements, May 29, 2015, 3GPP, 3GPP TSG RAN WG2 #90, Tdoc: R2-152725 (Year: 2015).*
Nokia Networks, UL delay measurement, Aug. 28, 2015, 3GPP, 3GPP TSG-RAN WG2 Meeting #91, Tdoc: R2-153145 (Year: 2015).*
Nokia Networks, UL QoS metrics, Aug. 28, 2015, 3GPP, 3GPP TSG-RAN WG2 Meeting #91, Tdoc: R2-153146 (Year: 2015).*
LG Electronics Inc., UL packet delay measurement in MDT, Aug. 28, 2015, 3GPP, 3GPP TSG-RAN WG2 Meeting #91, Tdoc: R2-153182 (Year: 2015).*
CMCC et al., Way forward on UL delay measurement, Aug. 28, 2015, 3GPP, 3GPP TSG-RAN WG2 Meeting #91, Tdoc: R2-153191 (Year: 2015).*
Kyocera, Post processing procedure of UL latency measurements, Aug. 28, 2015, 3GPP, 3GPP TSG-RAN WG2 #91, Tdoc: R2-153386 (Year: 2015).*
ZTE, UL delay measurement in MDT, Aug. 28, 2015, 3GPP, 3GPP TSG RAN WG2 #91, Tdoc: R2-153530 (Year: 2015).*
Qualcomm Incorporated, UL delay measurement, Aug. 28, 2015, 3GPP, 3GPP TSG-RAN WG2 Meeting #91, Tdoc: R2-153783 (Year: 2015).*
"3rd Generation Partnership Project; Technical Specification Group Radio Access Network; Evolved Universal Terrestrial Radio Access (E-UTRA); Requirements for support of radio resource management (Release 13)", 3GPP TS 36.133, V13.0.0, Jul. 2015, pp. 1-1412.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.6.0, Jun. 2015, pp. 1-449.
"Consideration on UL Delay Measurement", 3GPP TSG-RAN Working Group 2 meeting #90, R2-152490, Agenda: 7.8, Qualcomm Incorporated, May 25-29, 2015, 2 pages.
"Radio Measurements for feMDT", 3GPP TSG-RAN Working Group 2 meeting #90, R2-152290, Agenda: 7.8, Huawei, May 25-29, 2015, pp. 1-2.
"UL latency measurement in MDT", 3GPP TSG-RAN Working Group 2 meeting #90, R2-152296, Agenda: 7.8, LG Electronics Inc, May 25-29, 2015, pp. 1-2.
"UL QoS Metrics", 3GPP TSG-RAN Working Group 2 meeting #91, R2-153146, Agenda: 7.8, Nokia Networks, Aug. 24-28, 2015, 4 pages.
"Post Processing Procedure of UL Latency Measurements", 3GPP TSG-RAN Working Group 2 meeting #91, R2-153386, Agenda: 7.8, Kyocera, Aug. 24-28, 2015, pp. 1-3.
"3rd Generation Partnership Project; Technical Specification Group Radio Access Network; Evolved Universal Terrestrial Radio Access (E-UTRA); Layer 2—Measurements (Release 13)", 3GPP TS 36.314, V13.1.0, Mar. 2016, pp. 1-23.
"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 13)", 3GPP TS 37.320, V13.1.0 (Mar. 2016), pp. 1-26.
International Search Report and Written Opinion received for corresponding Patent Cooperation Treaty Application No. PCT/FI2016/050656, dated Dec. 12, 2016, 12 pages.
"Way Forward on UL Delay Measurement", 3GPP TSG-RAN Working Group 2 meeting #91, R2-153191, Agenda: 7.8, CMCC, Aug. 24-28, 2015, 9 pages.
LTE; Evolved Universal Terrestrial Radio Access (E-UTRA); Layer 2—Measurements, (3GPP TS 36.314 version 12.0.0 Release 12), ETSI TS 136 314 V12.0.0, Sep. 2014, 22 pages.
Extended European Search Report received for corresponding European Patent Application No. 16848201.6, dated Feb. 1, 2019, 10 pages.
Office action received for corresponding Korean Patent Application No. 2018-7011428, dated Feb. 13, 2019, 8 pages of office action and 6 pages of translation available.
"UL Delay Measurement in MDT", 3GPP TSG-RAN Working Group 2 meeting #91, R2-153530, Agenda: 7.8, ZTE, Aug. 24-28, 2015, 2 pages.

* cited by examiner

REPORTING OF UPLINK (UL) QUALITY OF SERVICE (QOS) METRICS

RELATED APPLICATIONS

This application was originally filed as Patent Cooperation Treaty Application No. PCT/FI2016/050656 filed Sep. 21, 2016 which claims priority benefit to U.S. Provisional Patent Application No 62/222,985, filed Sep. 24, 2015.

BACKGROUND

Field:

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to Minimization of Drive Tests (MDT) reporting.

Description of the Related Art:

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the enhanced Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A, introduced in LTE Rel-10, is carrier aggregation, which allows for increasing the data rates through aggregation of two or more LTE carriers, e.g., to the transmission bandwidth of up to 100 MHz. LTE-A in later releases may include even wider bandwidths as specified so far. Further, aggregating or interworking on the radio access level with the wireless LAN (ALAN) access network is foreseen.

SUMMARY

According to a first embodiment there is an apparatus comprising at least one processor and at least one memory storing computer executable instructions. In this embodiment the at least one processor is configured with the at least one memory and the computer executable instructions to cause the apparatus to at least: count a number of uplink protocol data control packet (PDCP) service data units (SDUs) in a measurement period and a number of the uplink PDCP SDUs that either exceeded a configured delay threshold or were discarded without being sent; process the counted numbers/values into a single reporting metric; and report to a radio network the single reporting metric.

According to a second embodiment there is a method comprising: counting a number of uplink protocol data control packet (PDCP) service data units (SDUs) in a measurement period and a number of the uplink PDCP SDUs that either exceeded a configured delay threshold or were discarded without being sent; processing the counted numbers/values into a single reporting metric; and reporting to a radio network the single reporting metric.

According to a third embodiment there is a memory tangibly storing computer instructions that when executed by at least one processor causes a host device to at least: count a number of uplink protocol data control packet (PDCP) service data units (SDUs) in a measurement period and a number of the uplink PDCP SDUs that either exceeded a configured delay threshold or were discarded without being sent; process the counted numbers/values into a single reporting metric; and report to a radio network the single reporting metric.

According to a fourth embodiment there is an apparatus comprising at least one processor and at least one memory storing computer executable instructions. In this embodiment the at least one processor is configured with the at least one memory and the computer executable instructions to cause the apparatus to at least: configure a user equipment (UE) with a delay threshold; and receive from the UE a report comprising a single reporting metric that reflects a number of uplink protocol data control packet (PDCP) service data units (SDUs) in a measurement period and a number of the uplink PDCP SDUs that either exceeded the configured delay threshold or were discarded without being sent.

According to a fifth embodiment there is a method comprising: configuring a user equipment (UE) with a delay threshold; and receiving from the UE a report comprising a single reporting metric that reflects a number of uplink protocol data control packet (PDCP) service data units (SDUs) in a measurement period and a number of the uplink PDCP SDUs that either exceeded the configured delay threshold or were discarded without being sent.

According to a sixth embodiment there is a memory tangibly storing computer instructions that when executed by at least one processor causes a host device to at least:

configure a user equipment (UE) with a delay threshold; and receive from the UE a report comprising a single reporting metric that reflects a number of uplink protocol data control packet (PDCP) service data units (SDUs) in a measurement period and a number of the uplink PDCP SDUs that either exceeded the configured delay threshold or were discarded without being sent.

BRIEF DESCRIPTION OF THE DRAWINGS

For proper understanding of the invention, reference should be made to the accompanying drawings, wherein.

DETAILED DESCRIPTION

Figure 1A:
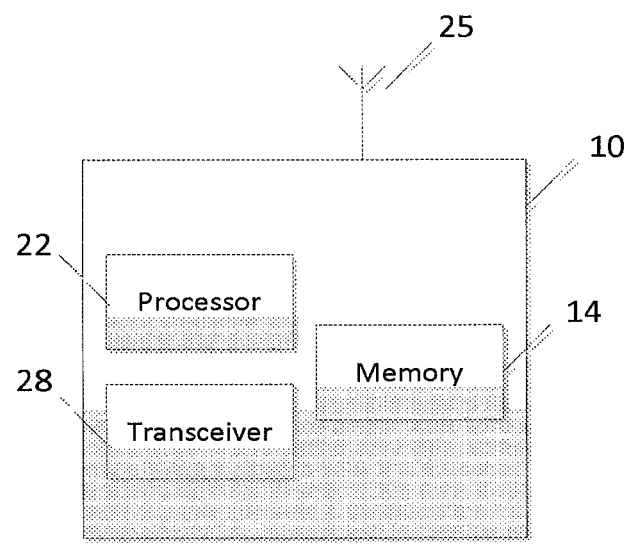
FIG. 1a illustrates a block diagram of an apparatus, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for the reporting of quality of service (QoS) metrics, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

3GPP RAN has an ongoing Rel-13 work item (WI) on enhancements for MDT functionality. A main goal of the work item is to provide new features for QoS verification for guaranteed bit rate (GBR) services, such as multimedia telephony (MMTEL) voice and video services.

It has been identified that some of the relevant metrics for uplink (UL) QoS verification are not directly available to the network. Such metrics are UL packet discard rate and queuing delay. Regardless of the defined measurement principle (particularly for the delay measurement) there should be an appropriate way to report the results to the network effectively while still providing essential information about the UL QoS behaviour. The measurement results need to be processed somehow to minimize the amount of data per report while still preserving sufficient information for the data analysis and detection of potential issues with UL QoS. An embodiment of the invention addresses options for the data processing and the format of the reported QoS metrics.

The MDT reporting should not have any negative impacts on the normal UE operation and connection quality and therefore the reporting should minimize the amount of data that is reported for MDT purposes. On the other hand, the MDT data should include sufficient information to either detect possible issues with QoS or identify the root cause of potential failure or unacceptable performance. Consequently, the reporting principle will be a trade-off between the overhead and the level of details provided for the QoS analysis.

The UL MDT QoS measurements and reporting are new features for the 3GPP radio and therefore there is no existing solutions defined so far for such function. Closest reference is the Block error rate (BLER) reporting for multimedia broadcast multicast service (MBMS) which was specified for Rel-12, for example in 3GPP TS 36.133 (Requirements for support of radio resource management) and 3GPP TS 36.331 (Radio Resource Control (RRC); Protocol specification).

With respect to UL packet queuing delay, a number of options have been proposed for how the delay measurement could be implemented with varying complexity (see for example, R2-152490 (Consideration on UL delay measurement), R2-152290 (Radio measurements for feMDT), and R2-152296 (UL latency measurement in MDT)). One option would be to carry time information in the UL packets. Resulting overhead would, however, become too large and it would require specific time reference to be configured and used. For these reasons, the timer based option is less optimal than the solutions where the UE performs the measurement separately and provides the result in a MDT report. Based on such a conclusion, an embodiment of the invention focuses on the case where UE measures the UL delay, processes it, and creates a report to be signalled to the network.

For MDT measurements there is normally a period for how often the result to be reported shall be generated. During that period, individual measurement results are processed in order to minimize the amount of data that will be reported to the network (minimization of overhead). With the delay measurement, the reported metric may not be just an average over the individual measurement results of the measurement period but rather indicates the cases where the delay may have caused degradation for the QoS. There are alternative options for how to indicate such cases. The UE may indicate, for example: a) to report the ratio between the delay exceeding a given threshold and all transmitted packets or the number of the discarded packets and total number of packet data convergence protocol (PDCP) packets (for example, see R2-152490 and R2-153146 (MDT QoS metrics), and/or b) jitter of the delay (for example, see R2-153386 (Post processing procedure of UL latency measurements).

The configuration of the delay threshold should reflect the required delay behaviour for the ongoing service, i.e., should likely be optimized separately for voice and video services.

With respect to UL packet discard, data arriving to PDCP layer in the UE may be subject to delay due to queuing until the radio resources become available. There are various options for how the queuing delay is measured. One example of the delay measurement is to measure the time between the arrival of a PDCP SDU from upper layers until the packet has been sent to lower layers for transmission. For delay sensitive traffic there will be a limit on how long the queuing can last. If the maximum allowed waiting time is exceeded, the data unit shall be discarded. The eNB will not be aware of the packet discard as the sequence numbering will be applied to packets that are sent to lower layers for transmission. For this reason, it has been suggested that the UE should report how often packet discard occurs. Packet discard can be considered as a special case of the delay measurement for which similar principles for the reporting would apply: With the delay measurements the emphasis would be on the "spikes" or largest delays, or jitter, where the extreme case is that the delay results in the packet discard.

Thus, embodiments provide solutions for the reporting of QoS metrics for GBR traffic (e.g., for MMTEL voice/video) where the measurement and reporting/logging period is varied and the data rates can vary.

In certain embodiments, for the UL delay measurements the options for the reported metrics may include the following:
1. the maximum delay experienced during the measurement period;
2. if any of the delay results exceed a given threshold;
3. how many results exceeded a given threshold;
4. the ratio between the results exceeding a given threshold vs. the number of all measurement results;
5. average delay experienced during the measurement period.

According to certain embodiments, for the packet discard the reporting options may include the following:
a) if any packet discard happened during the measurement period;
b) how many packets were discarded;
c) the number of/ratio between discarded packets and all packets arriving to PDCP;
d) if number of discarded packets exceeded a given threshold;
e) if the ratio between discarded packets and all packets arriving to PDCP exceeded a given threshold;
f) size of the discarded packet(s) (per packet);
g) size of the discarded data (per measurement period);
h) number of the consecutive discarded packets.

Embodiments of the invention provide a combined reporting of delay and packet discard measurements. In one embodiment, the individual reported value may convey the combined result of packets exceeding a configured threshold and the discarded packets, which may be done per measurement or reporting period. In certain embodiments, the report can combine the above options 2 and a), 3 and b), and/or 4 and c), or any other practical combination of the delay and discard measurements. Additionally or alternatively, the reported value may indicate if in the joint reported metric includes only delayed packets, only discarded packets, both types of results, the ratio of delayed and discarded packets, indication which one of the events were dominating (min. 1 bit indication), or none of the events happened.

The delay threshold for the delay measurement options 2-5 may be shorter than the time configured for the packet discard. The parameter may be configurable in order to match with the latency requirement for the QoS of the active service. An objective is the verification of QoS of MMTEL services, such as voice and video. For these two cases, the latency requirements are not identical and therefore the configured delay threshold value likely will be different.

In an embodiment, the minimum amount of reported data can be achieved using the above options 1 and a). Such metric could additionally be associated with the indication about the exceeded delay and packet discard as mentioned above. The other options may require coding of either the number of events or the ratio of events. The number of bits needed for the metric will depend on the length of the measurement or reporting period, the frequency of the packet arrival, required resolution of the reported metric, or the like. The coding in these cases could apply the principle used for the reporting of the MBMS BLER measurements. The coding can be either "linear" (the reported value indicates directly the number of events) or "progressive" (the resolution of the reported value decreases as the number of events increase). For longer measurement/reporting intervals the progressive coding may be preferable.

According to an example embodiment of the combined reporting, the single result per measurement report can:
include the amount of discarded PDCP service data units (SDUs) to the number of reported packets exceeding the given threshold; only a single value reported per measurement period
take into account the number of discarded PDCP SDUs in the reported ratio (e.g. percentage) of the options d) and 3).

In an embodiment, the overall procedure for the measurement may include the following:
1. UE is configured with a delay threshold;
2. Queuing delay is measured per each PDCP SDU;
3. UE counts the number of PDCP SDU and the number of SDUs exceeding the configured threshold;
4. UE counts the number of PDCP SDUs that have been discarded during the measurement period;
5. UE processes the results to a format applying options 2-5 and/or b)-h) and combining reporting principles discussed above, where
   a. The number of PDCP SDUs, the number of SDUs exceeding the delay threshold and the number of discarded PDCP SDUs are counted.
   b. The results of a. are processed to a single reported metric using the principles described above.
   c. UE either logs or reports the processed metric associated with the other parameters (location, time, cell measurement results) as required for MDT.
6. UE sends the MDT report to the network either immediately in a RRC measurement report (subject to reporting configuration), or the UE first stores the result (and associated other parameters) to a log for later reporting to the network (using for example UEInformation request/response-messages in LTE).

In certain embodiments, the measurement period can be configured (periodical reporting or logging), or it can be undefined implying to an event based measurement.

FIG. 1a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station in UMTS or eNB in LTE or LTE-A. However, in other embodiments, apparatus 10 may be other components within a radio access network. It should be noted that one of ordinary skill in the art would understand that apparatus 10 may include components or features not shown in FIG. 1a.

As illustrated in FIG. 1a, apparatus 10 includes a processor 22 for processing information and executing instructions or operations. Processor 22 may be any type of general or specific purpose processor. While a single processor 22 is shown in FIG. 1*a*, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS or an eNB in LTE or LTE-A, for example. According to certain embodiments, apparatus 10 may be controlled by memory 14 and processor 22 to configure a UE with a delay threshold, and to receive, from the UE, a combined report including UL delay measurement and packet discard measurement. In an embodiment, the combined report may include the UL delay measurement and packet discard measurement as a single reported value. According to an embodiment, the reported value may express the combined result of packets exceeding a configured threshold and the discarded packets per measurement or reporting period. In some embodiments, the reported value may express the ratio between the results exceeding a given threshold and the number of all measurement results, and the ratio between discarded packets and all packets arriving. In certain embodiments, the reported value may indicate whether the joint reported metric includes only delayed packets, only discarded packets, both types of results, the ratio of delayed and discarded packets, an indication which one of the events were dominating (min. 1 bit indication), or if none of the events happened.

In certain embodiments, the combined report may be received by apparatus 10 in a RRC measurement report. In other embodiments, the combined report may be received by apparatus 10 in a UEInformation response.

Figure 1B:
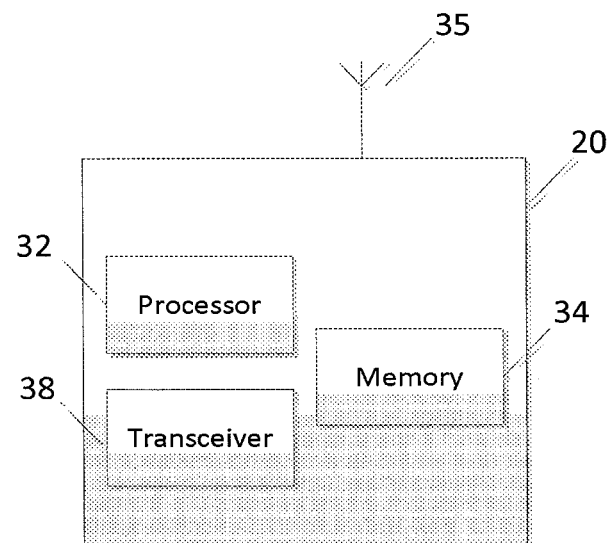
FIG. 1b illustrates a block diagram of an apparatus, according to another embodiment.

FIG. 1*b* illustrates an example of an apparatus 20 according to another embodiment. In an embodiment, apparatus 20 may be a node or element in a communications network or associated with such a network, such as a UE, mobile device, mobile unit, a machine type UE or other device. For instance, in some embodiments, apparatus 20 may be UE in LTE or LTE-A. It should be noted that one of ordinary skill in the art would understand that apparatus 20 may include components or features not shown in FIG. 1*b*.

As illustrated in FIG. 1*b*, apparatus 20 includes a processor 32 for processing information and executing instructions or operations. Processor 32 may be any type of general or specific purpose processor. While a single processor 32 is shown in FIG. 1*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. According to an embodiment, apparatus 20 may be configured with a delay threshold. In this embodiment, apparatus 20 may be controlled by memory 34 and processor 32 to count or determine the number of received packets (e.g., PDCP SDUs), determine when the number of packets exceed the configured delay threshold and by how many packets the threshold is exceeded. In an embodiment, apparatus 20 may also be controlled by memory 34 and processor 32 to count or determine the number of packets that are discarded, and to determine whether the number of discarded packets exceeded a given threshold.

According to one embodiment, apparatus 20 may then be controlled by memory 34 and processor 32 to produce a combined report that includes an individual reported value that conveys the UL delay measurement and packet discard measurement. According to an embodiment, the reported value may express the combined result of packets exceeding the configured delay threshold and the discarded packets per measurement or reporting period. In some embodiments, the reported value may express the ratio between the results exceeding a given threshold and the number of all measurement results, and the ratio between discarded packets and all packets arriving. In certain embodiments, the reported value may indicate whether the joint reported metric includes only delayed packets, only discarded packets, both types of results, the ratio of delayed and discarded packets, an indication which one of the events were dominating (min. 1 bit indication), or if none of the events happened.

According to an embodiment, apparatus 20 may also be controlled by memory 34 and processor 32 to send the combined report to the network (e.g., to an eNB). In certain embodiments, the combined report may be sent by apparatus 20 in a RRC measurement report. In other embodiments, the combined report may be sent by apparatus 20 in a UEInformation response.

Figure 2A:
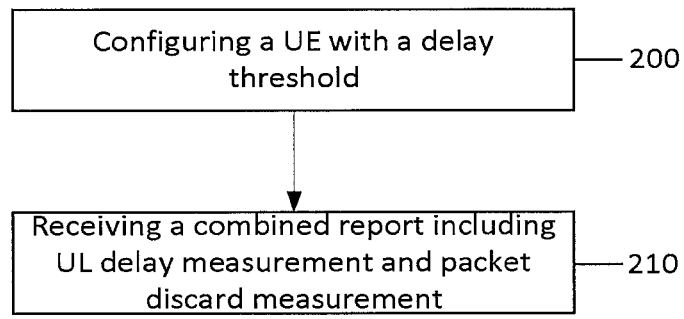
FIG. 2a illustrates a flow diagram of a method, according to one embodiment.

FIG. 2a illustrates an example flow diagram of a method, according to one embodiment. In certain embodiments, the method of FIG. 2a may be performed by a network node, such as a base station or eNB. As illustrated in FIG. 2a, the method may include, at 200, configuring a UE with a delay threshold and, at 210, receiving, from the UE, a combined report including UL delay measurement and packet discard measurement. In an embodiment, the combined report may include the UL delay measurement and packet discard measurement as a single reported value. According to an embodiment, the reported value may express the combined result of packets exceeding a configured threshold and the discarded packets per measurement or reporting period. In some embodiments, the reported value may express the ratio between the results exceeding a given threshold and the number of all measurement results, and the ratio between discarded packets and all packets arriving. In certain embodiments, the reported value may indicate whether the joint reported metric includes only delayed packets, only discarded packets, both types of results, the ratio of delayed and discarded packets, an indication which one of the events were dominating (min. 1 bit indication), or if none of the events happened. In certain embodiments, the receiving step 210 may include receiving the combined report in a RRC measurement report. In other embodiments, the receiving step 210 may include receiving the combined report in a UEInformation response.

Figure 2B:
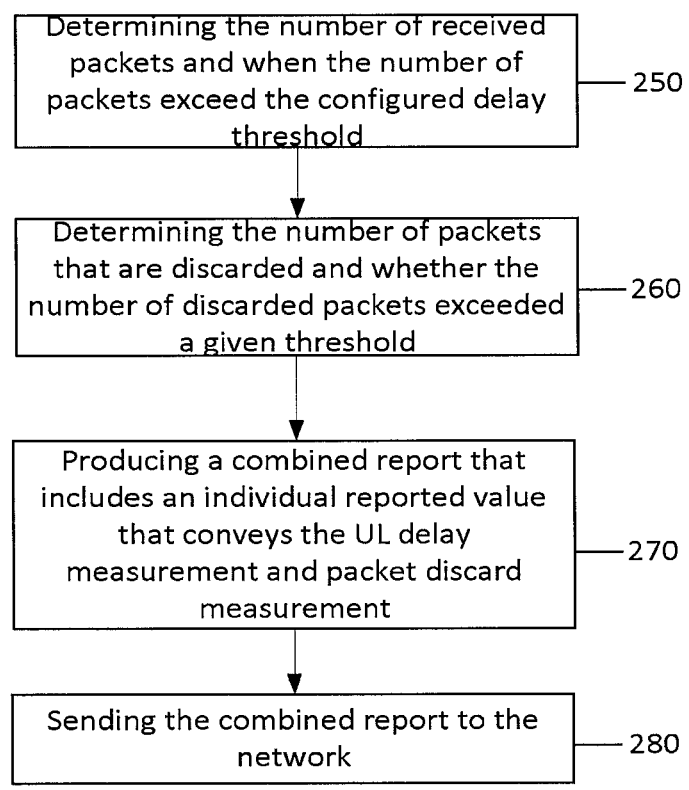
FIG. 2b illustrates a flow diagram of a method, according to another embodiment.

FIG. 2b illustrates an example flow diagram of a method, according to another embodiment of the invention. In certain embodiments, the method of FIG. 2b may be performed by a device, such as a UE in LTE or LTE-A. In an embodiment, the UE may be configured with a delay threshold. In this embodiment, the method may include, at 250, counting or determining the number of received packets (e.g., PDCP SDUs), determining when the number of packets exceed the configured delay threshold and by how many packets the threshold is exceeded. In an embodiment, the method may also include, at 260, counting or determining the number of packets that are discarded and determining whether the number of discarded packets exceeded a given threshold.

According to one embodiment, the method may then include, at 270, producing a combined report that includes an individual reported value that conveys the UL delay measurement and packet discard measurement. According to an embodiment, the reported value may express the combined result of packets exceeding the configured delay threshold and the discarded packets per measurement or reporting period. In some embodiments, the reported value may express the ratio between the results exceeding a given threshold and the number of all measurement results, and the ratio between discarded packets and all packets arriving. In certain embodiments, the reported value may indicate whether the joint reported metric includes only delayed packets, only discarded packets, both types of results, the ratio of delayed and discarded packets, an indication which one of the events were dominating (min. 1 bit indication), or if none of the events happened.

According to an embodiment, the method may include, at 280, sending the combined report to the network (e.g., to an eNB). In certain embodiments, the combined report may be sent in a RRC measurement report. In other embodiments, the combined report may be sent in a UEInformation response.

In view of the above, embodiments of the invention can provide several advantages and technical improvements. These advantages/improvements may include minimized signalling overhead due to MDT reporting, efficient "coding" of the combined information due to similarity of how the delay metric can be reported to the packet discard measurement, no separate configuration for the two measurements, and current MDT configuration and reporting mechanisms can be applied without the need for configuration of multiple parameters.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus comprising:
  at least one processor; and
  at least one non-transitory memory storing computer executable instructions, wherein the at least one processor is configured with the at least one non-transitory memory and the computer executable instructions to cause the apparatus to at least:
    count a first number of uplink protocol data control packet service data units in a measurement period;
    count at least one of a second number of the uplink protocol data control packet service data units that exceeded a configured delay threshold and at least one of a third number of the uplink protocol data control packet service data units that were discarded without being sent;
    process the first number, the at least one second number, and the at least one third number into a single combined reporting metric; and
    report to a radio network the single combined reporting metric.

2. The apparatus according to claim 1, wherein the configured delay threshold is received with the apparatus from the radio network and is specific for a given quality of service associated with the counted uplink protocol data control packet service data units.

3. The apparatus according to claim 2, wherein the configured delay threshold is a first delay threshold associated with a first quality of service and the radio network configures the apparatus with a second delay threshold associated with a different second quality of service, and the at least one processor is configured with the at least one non-transitory memory and the computer executable instructions to cause the apparatus to at least:
  store in the at least one non-transitory memory the second delay threshold;
  count a fourth number of the uplink protocol data control packet service data units associated with the different second quality of service in the measurement period and a fifth number of the uplink protocol data control packet service data units associated with the different second quality of service that exceeded the second delay threshold and/or were discarded without being sent;
  process into another iteration of the single combined reporting metric the counted numbers of uplink protocol data control packet service data units associated with the different second quality of service; and
  report to the radio network the other iteration of the single combined reporting metric.

4. The apparatus according to claim 1, wherein the single combined reporting metric is sent to the radio network in a minimization of drive test measurement report.

5. The apparatus according to claim 4, wherein the minimization of drive test measurement report is one of a Radio Resource Control measurement report or a UEInformation Response message.

6. The apparatus according to claim 1, wherein the measurement period is configured with the radio network.

7. The apparatus according to claim 1, wherein the configured delay threshold is a queuing delay threshold, and the at least one processor is configured with the at least one non-transitory memory and the computer executable instructions to cause the apparatus to count the at least one second number, where counting the at least one second number comprises:
  measuring for each of the respective uplink protocol data control packet service data units a time between arrival of the respective protocol data control packet service data units from upper layers until being sent to lower layers for transmission; and
  comparing the respectively measured time to the queuing delay threshold.

8. The apparatus according to claim 1, wherein the single combined reporting metric comprises a ratio of the counted numbers.

9. The apparatus according to claim 1, wherein the apparatus is a user equipment or is disposed within a user equipment, and the radio network operates with Long Term Evolution or LTE-A radio access technology.

10. A method comprising:
  counting a first number of uplink protocol data control packet service data units in a measurement period;
  counting at least one of a second number of the uplink protocol data control packet service data units that exceeded a configured delay threshold and at least one of a third number of the uplink protocol data control packet service data units that were discarded without being sent;

processing the first number, the at least one second number, and the at least one third number into a single combined reporting metric; and reporting to a radio network the single combined reporting metric.

11. A non-transitory memory tangibly storing computer instructions that when executed with at least one processor causes a host device to at least:
count a first number of uplink protocol data control packet service data units in a measurement period;
count at least one of a second number of the uplink protocol data control packet service data units that exceeded a configured delay threshold and at least one of a third number of the uplink protocol data control packet service data units that were discarded without being sent;
process the first number, the at least one second number, and the at least one third number into a single combined reporting metric; and
report to a radio network the single combined reporting metric.

12. An apparatus comprising:
at least one processor; and
at least one non-transitory memory storing computer executable instructions, wherein the at least one processor is configured with the at least one non-transitory memory and the computer executable instructions to cause the apparatus to at least:
configure a user equipment with a delay threshold; and
receive from the user equipment a report comprising a single combined reporting metric that reflects a first number of uplink protocol data control packet service data units in a measurement period and at least one of a second number of the uplink protocol data control packet service data units that exceeded the configured delay threshold and at least one of a third number of the uplink protocol data control packet service data units that were discarded without being sent.

13. The apparatus according to claim 12, wherein the configured delay threshold is specific for a given quality of service associated with the counted uplink protocol data control packet service data units.

14. The apparatus according to claim 13, wherein the configured delay threshold is a first delay threshold associated with a first quality of service, the received report is a first report and the apparatus configures the user equipment with a second delay threshold associated with a different second quality of service, wherein the at least one processor is configured with the at least one non-transitory memory and the computer executable instructions to cause the apparatus to at least:
receive from the user equipment a second report comprising another iteration of the single combined reporting metric that reflects a fourth number of uplink protocol data control packet service data units associated with the different second quality of service in the measurement period and at least one of a fifth number of the uplink protocol data control packet service data units associated with the different second quality of service that exceeded the configured second delay threshold and at least one of a sixth number of the uplink protocol data control packet service data units associated with the different second quality of service that were discarded without being sent.

15. The apparatus according to claim 12, wherein the received report comprises a minimization of drive test measurement report.

16. The apparatus according to claim 15, wherein the minimization of drive test measurement report is one of a Radio Resource Control measurement report or a UEInformation Response message.

17. The apparatus according to claim 12, wherein the measurement period is configured with the apparatus.

18. The apparatus according to claim 12, wherein the configured delay threshold is a queuing delay threshold, and the at least one second number of the uplink protocol data control packet service data units that exceeded the configured delay threshold or the at least one third number of the uplink protocol data control packet service data units that were discarded without being sent is a number of uplink protocol data control packet service data units for which a time between arrival from upper layers until being sent to lower layers for transmission exceeds the queuing delay threshold.

19. A method comprising:
configuring a user equipment with a delay threshold; and
receiving from the user equipment a report comprising a single combined reporting metric that reflects a first number of uplink protocol data control packet service data units in a measurement period and at least one of a second number of the uplink protocol data control packet service data units that exceeded the configured delay threshold and at least one of a third number of the uplink protocol data control packet service data units that were discarded without being sent.

20. A non-transitory memory tangibly storing computer instructions that when executed with at least one processor causes a host device to at least:
configure a user equipment with a delay threshold; and
receive from the user equipment a report comprising a single combined reporting metric that reflects a first number of uplink protocol data control packet service data units in a measurement period and at least one of a second number of the uplink protocol data control packet service data units that exceeded the configured delay threshold and at least one of a third number of the uplink protocol data control packet service data units that were discarded without being sent.

* * * * *